United States Patent
Ho et al.

(10) Patent No.: US 11,751,090 B2
(45) Date of Patent: Sep. 5, 2023

(54) REPORTING MECHANISMS FOR WIRELESS COMMUNICATIONS

(71) Applicant: QUALCOMM Incorporated, San Diego, CA (US)

(72) Inventors: Sai Yiu Duncan Ho, San Diego, CA (US); Alfred Asterjadhi, San Diego, CA (US); George Cherian, San Diego, CA (US); Abhishek Pramod Patil, San Diego, CA (US); Lochan Verma, Danville, CA (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 17/011,299

(22) Filed: Sep. 3, 2020

(65) Prior Publication Data

US 2021/0076251 A1  Mar. 11, 2021

Related U.S. Application Data

(60) Provisional application No. 62/896,766, filed on Sep. 6, 2019.

(51) Int. Cl.
   *H04W 28/02* (2009.01)
   *H04L 5/00* (2006.01)
   (Continued)

(52) U.S. Cl.
   CPC ....... *H04W 28/0268* (2013.01); *H04L 1/1614* (2013.01); *H04L 5/0055* (2013.01);
   (Continued)

(58) Field of Classification Search
   CPC ..... H04L 1/1614; H04L 1/1628; H04L 47/28; H04L 47/30; H04L 65/80; H04W 28/0236;
   (Continued)

(56) References Cited

U.S. PATENT DOCUMENTS

| 2015/0264098 A1 | 9/2015 | Dao et al. |
| 2015/0334026 A1* | 11/2015 | Hadavi ............... H04L 47/2408 370/235 |
| 2016/0380730 A1* | 12/2016 | Ghosh ................... H04B 17/00 370/329 |

(Continued)

FOREIGN PATENT DOCUMENTS

EP    3318030 A1    5/2018

OTHER PUBLICATIONS

International Search Report and Written Opinion—PCT/US2020/049423—ISA/EPO—dated Dec. 3, 2020.

*Primary Examiner* — Pao Sinkantarakorn
(74) *Attorney, Agent, or Firm* — Patterson + Sheridan, L.L.P./Qualcomm

(57) ABSTRACT

This disclosure provides systems, methods, and apparatuses, including computer programs encoded on computer-readable media, for reporting Quality of Service (QoS) feedback information. A method of wireless communication at an apparatus may include selecting, from a variable number of control fields, one or more control fields for inclusion in a frame, each control field comprising a control identifier field and a control information field. The control identifier field may include an indicator indicating a type of information for communication is QoS feedback information. The control information field may include one or more subfields containing the QoS feedback information. The method may further include generating the frame comprising the selected number of control fields, and outputting the frame for transmission.

30 Claims, 14 Drawing Sheets

(51) Int. Cl.
*H04L 1/1607* (2023.01)
*H04W 72/54* (2023.01)

(52) U.S. Cl.
CPC ... *H04W 28/0242* (2013.01); *H04W 28/0278* (2013.01); *H04W 72/54* (2023.01)

(58) Field of Classification Search
CPC ......... H04W 28/0242; H04W 28/0268; H04W 28/0278; H04W 72/08–087; H04W 72/1226; H04W 72/1231
See application file for complete search history.

(56) References Cited

U.S. PATENT DOCUMENTS

| | | | |
|---|---|---|---|
| 2018/0263047 A1 | 9/2018 | Kim et al. | |
| 2018/0317128 A1* | 11/2018 | Chun | H04L 1/0003 |
| 2019/0075583 A1* | 3/2019 | Park | H04W 28/06 |
| 2019/0082443 A1* | 3/2019 | Li | H04W 74/0816 |
| 2019/0261402 A1 | 8/2019 | Asterjadhi et al. | |
| 2020/0413285 A1* | 12/2020 | Li | H04W 80/02 |
| 2021/0153070 A1* | 5/2021 | Velev | H04W 28/0268 |
| 2021/0243792 A1* | 8/2021 | Ouchi | H04W 74/04 |

\* cited by examiner

| Control ID value | Meaning | Length of the Control information subfield (bits) | Content of the Control information subfield |
|---|---|---|---|
| 0 | Triggered response scheduling (TRS) | 26 | See 9.2.4.6a.1 (TRS Control) |
| 1 | Operating mode (OM) | 12 | See 9.2.4.6a.2 (OM Control) |
| 2 | HE link adaptation (HLA) | 26 | See 9.2.4.6a.3 (HLA Control) |
| 3 | Buffer status report (BSR) | 26 | See 9.2.4.6a.4 (BSR Control) |
| 4 | UL power headroom (UPH) | 8 | See 9.2.4.6a.5 (UPH Control) |
| 5 | Bandwidth query report (BQR) | 10 | See 9.2.4.6a.6 (BQR Control) |
| 6 | Command and status (CAS) | 8 | See 9.2.4.6a.7 (CAS Control) |
| 7 | QoS Feedback Report (QFR) | Between 8 and 26 | Contains one or more metrics |
| 8-14 | Reserved | | |
| 15 | ONES | 26 | See 10.8 (HT Control field operation) |

FIG. 5

| Ack Type subfield values | TID subfield values | Presence of Block Ack Starting Sequence Control subfield and Block Ack Bitmap subfields | Context of a Per AID TID Info subfield in a Multi-STA BlockAck frame |
|---|---|---|---|
| 0 | 0–7 | Present | Block acknowledgment context: Sent as an acknowledgment to QoS Data frames that solicit a BlockAck frame response or to a BlockAckReq frame. |
| 1 | 0–7 | Not present | Acknowledgment context: Sent as an acknowledgment to a QoS Data or QoS Null frame that solicits an Ack frame response. |
| 0 or 1 | 8–13 | N/A | Reserved |
| 0 | 14 | Present | Use Feedback context: One or more subfields of BA Information contain the metrics described above. |
| 1 | 14 | Not present | All ack context: Sent as an acknowledgment to an A-MPDU or multi-TID A-MPDU that contains an MPDU that solicits an immediate response and all MPDUs contained in the A-MPDU or multi-TID A-MPDU are received successfully. |
| 0 | 15 | N/A | Reserved |
| 1 | 15 | Not present | Management frame/PS-Poll acknowledgment context: Sent as an acknowledgment to a Management frame carried in an A-MPDU or S-MPDU, or PS-Poll frame in an S-MPDU. |

NOTE—Additional rules for acknowledgment, block acknowledgment and all ack are defined in 26.4.2 (Acknowledgment context in a Multi-STA BlockAck frame) for a multi-TID A-MPDU.

FIG. 7

REPORTING MECHANISMS FOR WIRELESS COMMUNICATIONS

CLAIM OF PRIORITY

This application claims the benefit of U.S. Provisional Patent Application No. 62/896,766, entitled, "REPORTING MECHANISMS FOR WIRELESS COMMUNICATIONS" filed on Sep. 6, 2019, which is expressly incorporated by reference herein in its entirety.

TECHNICAL FIELD

This disclosure relates generally to wireless communication, and more particularly to reporting mechanisms for wireless communications in a wireless local area network (WLAN).

BACKGROUND

A wireless local area network (WLAN) may be formed by two or more WLAN devices (which may be referred to as stations (STAs)) that share a wireless communication medium using common service settings. One or more of the WLAN devices (which may be referred to as an access point (AP)) may establish the common service settings. An AP is a type of STA that performs a distribution system access function in the WLAN. The basic building block of a WLAN conforming to the Institute of Electrical and Electronics Engineers (IEEE) 802.11 family of standards is a Basic Service Set (BSS), which is managed by an AP. Each BSS is identified by a service set identifier (SSID) that is advertised by the AP. An AP periodically broadcasts beacon frames to enable other STAs within wireless range of the AP to establish or maintain a communication link with the WLAN. The AP and STAs may exchange various types of frames, such as management frames, control frames, and data frames.

SUMMARY

The systems, methods, and devices of this disclosure each have several innovative aspects, no single one of which is solely responsible for the desirable attributes disclosed herein.

One innovative aspect of the subject matter described in this disclosure can be implemented as a method of wireless communication at an apparatus. The method may include selecting, from a variable number of control fields, one or more control fields for inclusion in a frame, each control field comprising a control identifier field and a control information field. The control identifier field may include an indicator indicating a type of information for communication is QoS feedback information. The control information field may include one or more subfields containing the QoS feedback information. The method may further include generating the frame comprising the selected number of control fields, and outputting the frame for transmission.

Another innovative aspect of the subject matter described in this disclosure can be implemented as a method of wireless communication at an apparatus. The method may include obtaining a frame from a first wireless node, the frame including one or more control fields, each control field comprising a control identifier field and a control information field, the control identifier field including an indicator indicating a type of information for communication is QoS feedback information, the control information field including one or more subfields containing the QoS feedback information. The method may further include adjusting a schedule for transmission based on the QoS feedback information.

Another innovative aspect of the subject matter described in this disclosure can be implemented as a method of wireless communication at an apparatus. The method may include generating a BA frame comprising a BA information field, the BA information field including one or more per AID TID information fields, the one or more per AID TID information fields including an indicator indicating a presence of QoS feedback information, the BA information field further including one or more subfields containing the QoS feedback information. The method may further include outputting the BA frame for transmission.

Another innovative aspect of the subject matter described in this disclosure can be implemented as a method of wireless communication at an apparatus. The method may include obtaining from a first wireless node a BA frame comprising a BA information field, the BA information field including one or more per AID TID information fields, the one or more per AID TID information fields including an indicator indicating a presence of QoS feedback information, the BA information field further including one or more subfields containing the QoS feedback information. The method may further include adjusting a schedule for transmission based on the QoS feedback information.

Another innovative aspect of the subject matter described in this disclosure can be implemented as a method of wireless communication at an apparatus. The method may include obtaining a first frame including a request for QoS feedback information. The method may further include generating a second frame in response to obtaining the first frame, the second frame including a report containing the QoS feedback information. The method may further include outputting the second frame for transmission.

Another innovative aspect of the subject matter described in this disclosure can be implemented as a method of wireless communication at an apparatus. The method may include generating a first frame including a request for QoS feedback information. The method may further include outputting the first frame for transmission. The method may further include obtaining a second frame from a first wireless node in response to the outputting of the first frame, the second frame including a report containing the QoS feedback information. The method may further include adjusting a schedule for transmission based on the QoS feedback information.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 5 is a chart illustrating example values for a control ID field in accordance with aspects of the present disclosure.

FIG. 7 is a chart illustrating example values for a per AID TID information field in accordance with aspects of the present disclosure.

Like reference numbers and designations in the various drawings indicate like elements.

DETAILED DESCRIPTION

Figure 1:
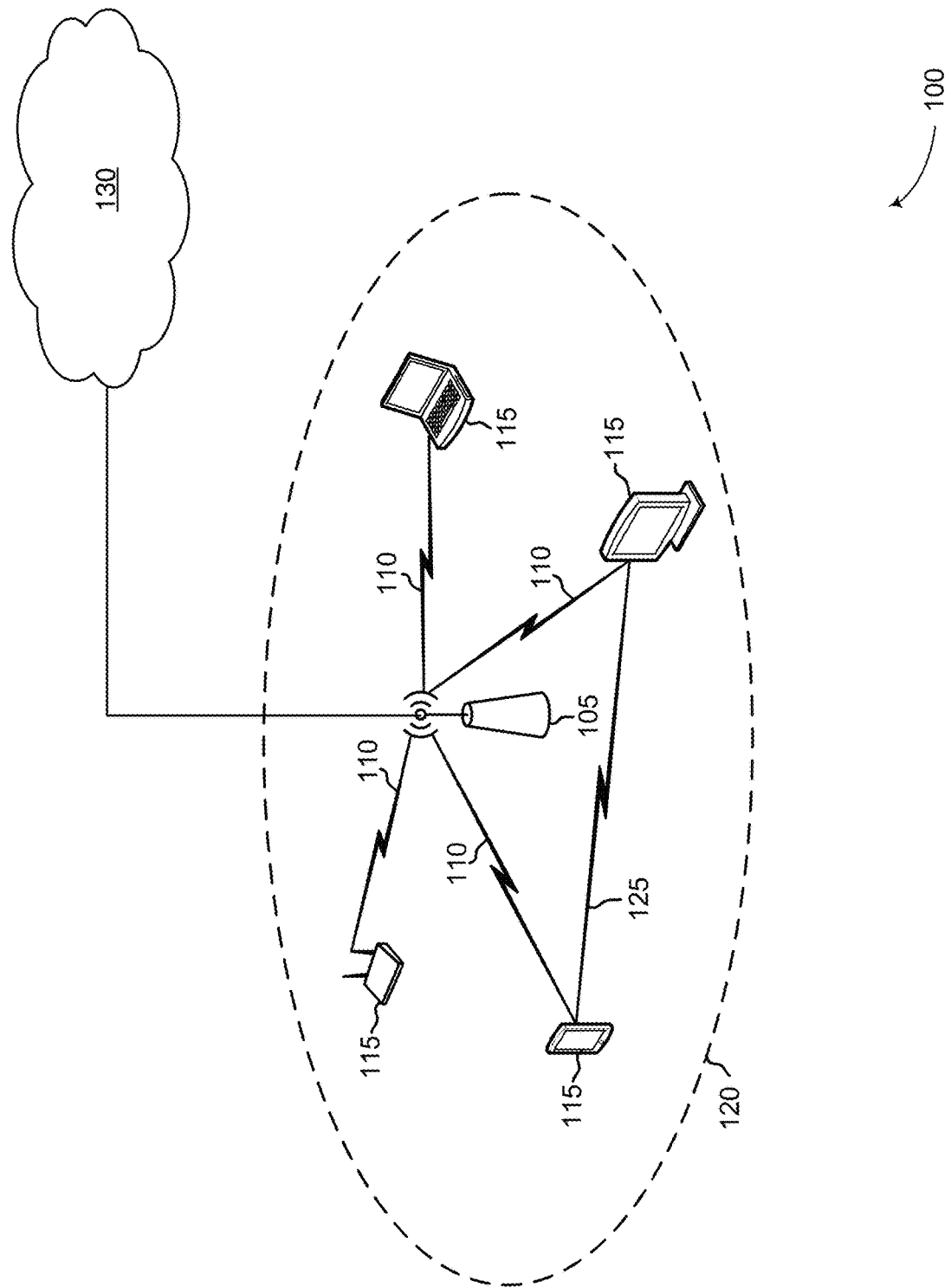
FIG. 1 illustrates an example wireless communication network that supports reporting mechanisms in accordance with aspects of the present disclosure.

The described features generally relate to reporting mechanisms for wireless communications, such as mechanisms for low latency stations (STAs) to report Quality of Service (QoS) metrics. STAs, including APs, can generate frames that include an indication of at least one low latency parameter or QoS metric. The STAs can transmit these frames to other STAs and APs, which can then adjust their schedulers and scheduled transmissions according to the low latency parameter(s) or QoS metric(s) indicated in the frames. In so doing, the receiving STAs and APs can meet the low latency or QoS requirements of the transmitting STAs and APs.

Low latency parameters or QoS metrics can include, but not be limited to, low latency metrics, timing metrics, buffer metrics, end-to-end latency, delay, jitter, packet loss, user-experienced data rate, target transmission time, target reception time, periodicity of packet inter-arrival time, buffer unit aging timer, buffer overflow flag, buffer increase rate, and the like. The low latency parameters or QoS metrics can be included in the Media Access Control (MAC) header of MAC protocol data units (MPDUs), in a Block Acknowledgement (BA) frame, and/or in a response to a QoS feedback request. Such mechanisms can enable flexible, dynamic, and proactive reporting of low latency parameters or QoS metrics on a per-MPDU basis, not only as part of an initial negotiation between STAs, or between STAs and APs. In so doing, STAs and APs can have an up-to-date snapshot of the internal queues of other STAs or APs in order to better manage time-sensitive traffic.

The following description is directed to certain implementations for the purposes of describing the innovative aspects of this disclosure. However, a person having ordinary skill in the art will readily recognize that the teachings herein can be applied in a multitude of different ways. The examples in this disclosure are based on wireless local area network (WLAN) communication according to the Institute of Electrical and Electronics Engineers (IEEE) 802.11 wireless standards. However, the described implementations may be implemented in any device, system or network that is capable of transmitting and receiving radio frequency (RF) signals according to one or more of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing 3G, 4G, 5G, 6G, or further implementations thereof, technology.

A wireless local area network (WLAN) in a home, apartment, business, or other area may include one or more WLAN devices. Each WLAN device may have a station (STA) interface which is an addressable entity that shares a wireless communication medium with other STAs. An access point (AP) is a WLAN device that includes a STA interface as well as a distribution system access function. For brevity in this disclosure, WLAN devices may be referred to as STAs, regardless of whether the WLAN device is an AP or a non-AP STA. A wireless node or a wireless apparatus may refer to a WLAN device (whether an AP or a non-AP STA), or may refer to a wireless chipset of a WLAN device that manages and implements wireless communications. A first WLAN device (acting as a sending STA) may communicate data to a second WLAN device (acting as a receiving STA) via a wireless channel. For example, the first WLAN device may transmit a physical layer convergence procedure (PLCP) protocol data unit (PPDU) to the second WLAN device. A PPDU may include one or more PLCP service data units (PSDUs). The PSDUs are media access control (MAC) protocol data units (MPDUs) that have been provided from the MAC layer to the PHY layer to form the PPDU. A PPDU also may be referred to as a frame, and the PSDUs and MPDUs also may be referred to as packets in some aspects of this disclosure.

APs and STAs may function and communicate according to the IEEE 802.11 family of standards (such as that defined by the IEEE 802.11-2016 specification or amendments thereof including, but not limited to, 802.11a, 802.11b, 802.11g, 802.11n, 802.11ac, 802.11ah, 802.11aq, 802.11ad, 802.11ay, 802.11az, 802.11ba, 802.11ax, and 802.11be). The IEEE standards body that is working on the IEEE 802.11be protocol (which also may be referred to as the extreme high throughput (EHT) protocol) is planning to improve the management of low latency WLAN communications in both managed networks (such as enterprise and industrial networks) and unmanaged networks (such as home networks). Many emerging real-time applications, such as virtual reality (VR) applications, augmented reality (AR) applications, and mobile gaming, have low latency and delay jitter requirements for optimal performance and user experience.

FIG. 1 illustrates an example wireless communication network 100 that supports reporting mechanisms in accordance with aspects of the present disclosure. According to some aspects, the wireless communication network 100 can be an example of a WLAN such as a Wi-Fi network (and will hereinafter be referred to as WLAN 100). For example, the WLAN 100 can be a network implementing at least one of the IEEE 802.11 family of standards defined by the IEEE 802.11-2016 specification or amendments thereof (such as IEEE 802.11a, 802.11b, 802.11g, 802.11n, 802.11ac, 802.11ah, 802.11aq, 802.11ad, 802.11ay, 802.11az, 802.11ba, 802.11ax, 802.11be, etc.). The WLAN 100 may include numerous wireless communication devices such as an AP 105 and multiple STAs 115 having wireless associations with the AP 105. The IEEE 802.11-2016 specification defines a STA as an addressable unit. An AP is an entity that contains at least one STA and provides access via a wireless medium (WM) for associated STAs to access a distribution service (such as another network 130). Thus, an AP includes a STA and a distribution system access function (DSAF). In the example of FIG. 1, the AP 105 may be connected to a gateway device (not shown) which provides connectivity to the other network 140. The DSAF of the AP 105 may provide access between the STAs 115 and another network 140. While AP 105 is described as an access point using an infrastructure mode, in some implementations, the AP 105 may be a traditional STA which is operating as an AP. For example, the AP 105 may be a STA capable of operating in a peer-to-peer mode or independent mode. In some other examples, the AP 105 may be a software AP (SAP) operating on a computer system.

Each of the STAs 115 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), wearable devices, music or other audio or stereo devices, remote control devices ("remotes"), printers, kitchen or other household appliances, key fobs (for example, for passive keyless entry and start (PKES) systems), among other possibilities.

The AP 105 and the associated STAs 115 may be referred to as a BSS, which is managed by the AP 105. A BSS refers to one STA (such as an AP) that has established service settings and one or more STAs that have successfully synchronized the service settings. Alternatively, a BSS may describe a set of STAs have synchronized matching mesh service profiles. Using the example architecture in FIG. 1, the BSS may be identified by a service set identifier (SSID) that is advertised by the AP 105. The AP 105 may periodically broadcast beacon frames ("beacons") to enable any STAs 115 within wireless range of the AP 105 to establish or maintain a respective communication link 110 (also referred to as a "Wi-Fi link" or "wireless association") with the AP. An "unassociated STA" (not shown) may not be considered part of the BSS because they do not have a wireless session established at the AP 105. The various STAs 115 in the WLAN 100 may be able to communicate with external networks as well as with one another via the AP 105 and respective communication links 110.

To establish a communication link 110 with an AP 105, each of the STAs 115 is configured to perform passive or active scanning operations ("scans") on frequency channels in one or more frequency bands (for example, the 2.4 GHz, 5 GHz, 6 GHz or 60 GHz bands). To perform passive scanning, a STA listens for beacons, which are transmitted by respective APs 102 at a periodic time interval referred to as the target beacon transmission time (TBTT) (measured in time units (TUs) where one TU is equal to 1024 microseconds (s)). To perform active scanning, a STA 115 generates and sequentially transmits probe requests on each channel to be scanned and listens for probe responses from APs 105. Each STA 115 may be configured to identify or select an AP 105 with which to associate based on the scanning information obtained through the passive or active scans, and to perform authentication and association operations to establish a communication link with the selected AP 105.

FIG. 1 additionally shows an example coverage area 120 of the AP 105, which may represent a basic service area (BSA) of the WLAN 100. While one AP 105 is shown in FIG. 1, the WLAN 100 can include multiple APs. Although not shown in FIG. 1, a STA 115 may be located in the intersection of more than one coverage area 120 and may associate with more than one AP 105. A single AP 105 and an associated set of STAs 115, or multiple APs 105 and associated sets of STAs 115 may be referred to as a basic service set (BSS). As a result of the increasing ubiquity of wireless networks, a STA 115 may have the opportunity to select one of many BSSs within range of the STA 115 or select among multiple APs that together form an extended service set (ESS) including multiple connected BSSs. An ESS is a set of connected BSSs. An extended network station associated with the WLAN 100 may be connected to a wired or wireless distribution system (not shown). The distribution system may allow multiple APs to be connected in such an ESS. As such, a STA 115 can be covered by more than one AP 105 and can associate with different APs at different times for different transmissions.

In some cases, the coverage area 120 of an AP 105 may be divided into sectors (not shown). The WLAN 100 may include APs 105 of different types (e.g., metropolitan area, home network, etc.), with varying and overlapping coverage areas 120. Two or more STAs 115 may also communicate directly via a direct wireless link 125 regardless of whether both STAs 115 are in the same coverage area 120. Examples of direct wireless links 125 may include Wi-Fi Direct connections, Wi-Fi Tunneled Direct Link Setup (TDLS) links, and other group connections. For example, peer-to-peer connections or ad hoc networks may be implemented within WLAN 100.

The APs 105 and STAs 115 may function and communicate (via the respective communication links 110 and 125) according to the IEEE 802.11 family of standards (such as that defined by the IEEE 802.11-2016 specification or amendments thereof including, but not limited to, 802.11a, 802.11b, 802.11g, 802.11n, 802.11ac, 802.11ah, 802.11aq, 802.11ad, 802.11ay, 802.11az, 802.11ba, 802.11ax, 802.11be, etc.). These standards define the WLAN radio and baseband protocols for the PHY and MAC layers. The APs 105 and STAs 115 transmit and receive frames (which also may be referred to as transmissions, communications, or wireless communications) to and from one another in the form of PPDUs. Each PPDU is a composite frame that includes a PLCP preamble and header (which also may be referred to as a PHY preamble and header) as well as one or more PSDUs (which may be derived from MPDUs in the MAC layer), each including a MAC header.

The APs 105 and STAs 115 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 105 and STAs 115 described herein also may communicate in other frequency bands, such as the 6 GHz band, which may support both licensed and unlicensed communications. The APs 105 and STAs 115 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be (which also may be referred to as extreme high throughput (EHT)) standard amendments may be transmitted over the 2.4 and 5 GHz bands, each of which is divided into multiple 20 MHz channels. As such, these PPDUs may be transmitted over a physical channel having a minimum bandwidth of 20 MHz. But larger channels can be formed through channel bonding. For example, PPDUs conforming to the IEEE 802.11n, 802.11ac, 802.11ax, and 802.11be standard amendments may be transmitted over physical channels having bandwidths of 40 MHz, 80 MHz or 160 MHz by bonding together two or more 20 MHz channels. For example, IEEE 802.11n described the use of up to 2 channels (for a combined 40 MHz bandwidth) and defined a High Throughput (HT) transmission format. IEEE 802.11ac described the use of up to 8 channels (for a maximum combined 160 MHz bandwidth) and defined a Very High Throughput (VHT) transmission format. IEEE 802.11ax also supports up to a combined 160 MHz bandwidth (which may be a combination of up to 8 channels of 20 MHz width each). IEEE 802.11be may support up to a combined 320 MHz bandwidth (which may be a combination of up to 16 channels of 20 MHz width each).

FIG. 1 illustrates an example of various components that may be utilized in a wireless node or wireless device 200 that supports reporting mechanisms in accordance with aspects of the present disclosure. In some examples, the wireless device 200 may implement aspects of wireless communication network 100. The wireless device 200 is an example of a device that may be configured to implement the various methods described herein. The wireless device 200 may implement an AP 105 and/or a STA 115.

The wireless device 200 may include a processor 205 which controls operation of the wireless device 200. The processor 205 may also be referred to as a central processing unit (CPU). Memory 210, which may include both read-only memory (ROM) and random-access memory (RAM), provides instructions and data to the processor 205. A portion of the memory 210 may also include non-volatile random-access memory (NVRAM). The processor 205 may perform logical and arithmetic operations based on program instructions stored within the memory 210. The instructions in the memory 210 may be executable to implement the methods described herein.

The processor 205 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 200 may also include a housing 215 that may include a transmitter 220 and a receiver 225 to allow transmission and reception of data between the wireless device 200 and a remote node. The transmitter 220 and receiver 225 may be combined into a transceiver 230. A single or a plurality of transceiver antennas 235 may be attached to the housing 215 and electrically coupled to the transceiver 230. The wireless device 200 may also include (not shown) multiple transmitters, multiple receivers, and multiple transceivers.

The wireless device 200 may also include a signal detector 240 that may be used in an effort to detect and quantify the level of signals received by the transceiver 230. The signal detector 240 may detect such signals as total energy, energy per subcarrier per symbol, power spectral density and other signals. The wireless device 200 may also include a digital signal processor (DSP) 245 for use in processing signals.

The various components of the wireless device 200 may be coupled together by a bus system 250, which may include a power bus, a control signal bus, and a status signal bus in addition to a data bus.

Figure 2:
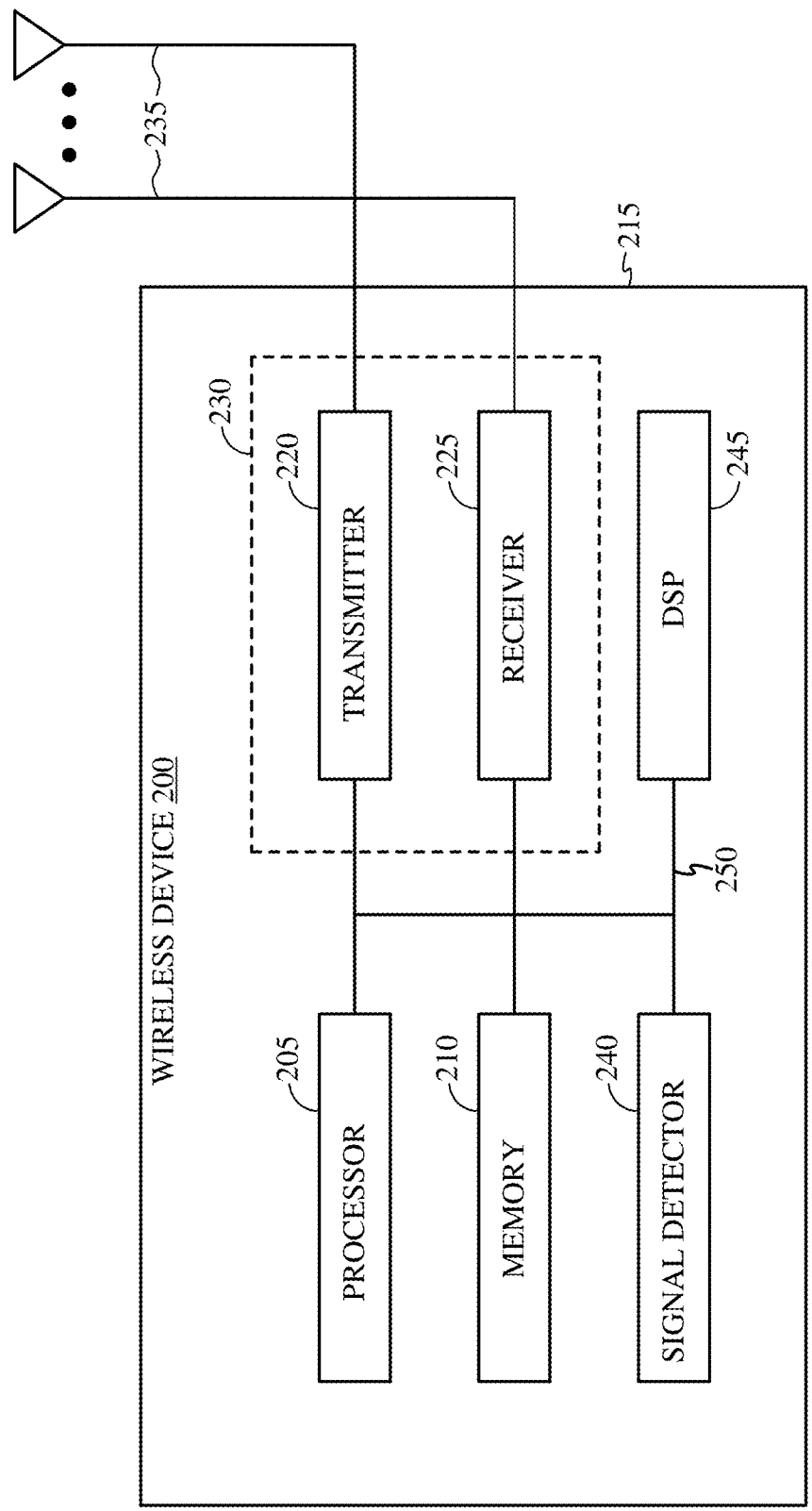
FIG. 2 illustrates an example of various components that may be utilized in a wireless node that supports reporting mechanisms in accordance with aspects of the present disclosure.

Although a number of separate components are illustrated in FIG. 2, those of skill in the art will recognize that one or more of the components may be combined or commonly implemented. For example, the processor 205 may be used to implement not only the functionality described above with respect to the processor 205, but also to implement the functionality described above with respect to the signal detector 240 and/or the DSP 245. Further, each of the components illustrated in FIG. 2 may be implemented using a plurality of separate elements. Moreover, additional components not illustrated in FIG. 2 may be included in the wireless device 200. Those of skill in the art will also recognize that one or more components illustrated in FIG. 2 may not be included in the wireless device 200.

Certain aspects of the present disclosure support transmitting and receiving an uplink (UL) signal, a downlink (DL) signal, or a peer-link signal between one or more STAs and/or APs, such as between a STA and an AP, an AP and a STA, a STA and another STA, and/or an AP and another AP. In some examples, the signals may be transmitted in a multi-user multiple input multiple output (MU-MIMO) system. Alternatively, the signals may be transmitted in a multi-user orthogonal frequency-division multiple access (MU-OFDMA) or other FDMA system. In some aspects, these signals may be transmitted using one or more of the transmitter 220 or the transceiver 230. The wireless device 200 may comprise an AP 105 and/or a STA 115, and may be used to transmit and/or receive communications. That is, either AP 105 and/or STA 115 may serve as transmitter devices and/or receiver devices.

In some aspects, metrics for low latency and time sensitive traffic may be exchanged between STAs and/or APs using an 802.11 protocol in order to enable traffic coordination such that low latency Quality of Service (QoS) requirements of the STAs and/or APs are met. For example, STAs and/or APs may exchange QoS feedback information, including low latency metrics, on a per-MPDU or per-packet basis. In addition to, or as an alternative to, providing QoS metrics during negotiation, STAs and/or APs can provide QoS feedback information in a flexible and dynamic reporting mechanism to enable up-to-date information of internal data buffer queues of STAs and/or APs. By including the QoS feedback information on a per-packet basis, any change in such parameters can be frequently reported to the receiving STA(s) and/or AP(s) to dynamically manage their traffic in an efficient manner and satisfy the low latency QoS requirements. As used herein, a transmitting STA or AP may refer to a STA or AP that transmits the QoS feedback information, and a receiving STA or AP may refer to a STA or AP that receives the QoS feedback information.

According to some aspects, the QoS feedback information may include various types of QoS metrics, such as low latency metrics, timing metrics, buffer metrics, and the like. For example, the low latency metrics may include a delay, a delay jitter, an end-to-end latency, a packet loss rate, a data rate, and any factor that contributes to latency. The delay may be an 802.11 link transmission delay, a non-802.11 link transmission delay, a signal processing delay, a delay caused by synchronization, etc. The delay jitter may reflect a fluctuation of latency over time and may be calculated as a standard deviation during a period time. The delay jitter can be evaluated by the time difference between two adjacent ping values, such as in a gaming or other real-time mobile application. The end-to-end latency may be a system level round trip time among devices in a feedback loop system involving an 802.11 link that transmits data between the devices. The packet loss may be an MSDU delivery failure observed at a STA's MAC-SAP. The packet loss may not include frame error which is recovered by MAC layer retransmissions. The data rate may be a user experienced data rate or a minimum data rate required to achieve a sufficient quality experience.

For example, the timing metrics may include a target transmission time (uplink and/or downlink), a target reception time (uplink and/or downlink), a periodicity of packet inter-arrival time, and any factor that contributes to timing for scheduling uplink and/or downlink transmissions/receptions. For example, the buffer metrics may include a buffer unit aging timer, a buffer overflow flag, a buffer increase rate, and any buffer unit relevant metric. It would be beneficial for a receiving STA and/or AP to receive an indication of an amount of data buffered at a transmitting STA and/or AP, an age of the data or how long the data has been residing in the queue, a capacity of the buffer units, and/or a rate at which the buffer units are being filled. Data staying in the queue can eventually time out and be discarded if it passes a predetermined threshold, and buffer overflow can occur when an incoming data rate is greater than an outgoing data rate. By receiving latency, timing, and buffer metrics, the receiving STA(s) and/or AP(s) can adjust their schedulers to enable efficient data communication. Other metrics than those listed above may be included in the QoS feedback information.

In some aspects, the transmitting STA and/or AP may measure or determine actual values for each metric included in the QoS feedback information. In some aspects, the transmitting STA and/or AP may measure or determine an instantaneous value for each metric included in the QoS feedback information. In some aspects, the transmitting STA and/or AP may determine an average value for each metric included in the QoS feedback information. The average value may be an average value over multiple transmit opportunities, an average value over multiple beacon intervals, or any other value that is averaged over a period of time for each QoS metric. A combination of instantaneous and average values may be used as well for the QoS metrics in the QoS feedback information.

In some aspects, the transmitting STA and/or AP may provide limited QoS feedback information. For example, the limited QoS feedback information may comprise parameters indicative of a delay, a schedule, a buffer overflow, a packet loss, or a combination thereof, although other QoS metrics may also be used, e.g., the latency, timing and buffer metrics described above. The transmitting STA and/or AP may determine whether actual values for each of the parameters meets or exceeds a predetermined threshold for each of the parameters. The QoS feedback information may comprise one or more indicators indicating whether each of the actual values meets or exceeds its associated predetermined threshold. For instance, the one or more indicators may comprise a first indicator indicating whether an actual value for the delay meets or exceeds a predetermined delay threshold, a second indicator indicating whether the schedule of the transmitting STA and/or AP is satisfied, a third indicator indicating whether a buffer overflow event has occurred, a fourth indicator indicating whether an actual value for the packet loss meets or exceeds a predetermined packet loss threshold, or a combination thereof. Other indicators may be used for other parameters or QoS metrics. Each indicator may comprise a bit indicating whether the predetermined threshold has been met, e.g., a value of "0" may indicate the predetermined threshold has not been met and a value of "1" may indicate the predetermined threshold has been met. However, other configurations for the limited QoS feedback information may be used.

According to some aspects, the QoS feedback information may be included in a QoS feedback report. In some aspects, a bitmap may contain the QoS feedback information. The QoS feedback report and/or bitmap may include actual values or limited values (as described above) for each of the QoS metrics. According to some aspects, the type of QoS metric(s) (e.g., the latency, timing, and buffer metrics describe above) that are to be included in the QoS feedback information may be negotiated and agreed upon between STAs and/or APs. The transmitting STA/AP or the receiving STA/AP may indicate one or more metric types for inclusion in the QoS feedback information prior to transmission of the QoS feedback information. Based on the indicated metric types for inclusion, the transmitting STA/AP can include values only for the indicated metric types in the QoS feedback information.

In some aspects, the transmitting STA/AP or the receiving STA/AP may use a counter to represent values for the QoS metrics on a normalized scale. In other words, the transmitting STA/AP may normalize values for inclusion in the QoS feedback information or the receiving STA/AP may normalize values of the received QoS feedback information based on a predetermined range standardized by an 802.11 protocol. Normalization of the values for the QoS feedback information adjusts values measured on different ranges from various transmitting STAs and/or APs to a common range that is to be determined by an 802.11 protocol. In so doing, the receiving STAs and/or APs can accurately compare different QoS feedback information from various transmitting STAs and/or APs on a common scale.

According to some aspects, one or more reporting mechanisms may enable transmitting STAs/APs to signal low latency or time sensitive traffic to receiving STAs/APs. The reporting mechanisms may allow QoS feedback information to be shared from a STA to an AP, from an AP to a STA, from a STA to another STA, and/or from an AP to another AP. The QoS feedback information may be signaled within exchanged frames and included in various containers (e.g., a frame, element, field, etc.). Transmitting STAs and/or APs may each generate a frame including QoS feedback information, including an indication of one or more QoS metric. The transmitting STAs and/or APs may transmit the frames to receiving STAs and/or APs. Based on the QoS feedback information from each of the transmitting STAs and/or APs, the receiving STAs and/or APs may then determine a transmission schedule or adjust a transmission schedule to accommodate the QoS requirements of each of the transmitting STAs and/or APs, as indicated in the QoS feedback information.

For example, a receiving STA/AP may receive from a first STA/AP a first frame including QoS feedback information associated with the first STA/AP. The receiving STA/AP may also receive from a second STA/AP a second frame including QoS feedback information associated with the second STA/AP. The receiving STA/AP may compare the QoS feedback information from the first STA/AP with the QoS feedback information from the second STA/AP. Based on the comparison of the QoS feedback information received from the first STA/AP and the second STA/AP, the receiving STA/AP may adjust its schedule for transmission to prioritize transmission to or reception from the first STA/AP over transmission to or reception from the second STA/AP. For instance, the receiving STA/AP may use a transmit opportunity that was previously scheduled for the second STA/AP for transmission to or reception from the first STA/AP. Alternatively, based on the comparison of QoS feedback information, the receiving STA/AP may adjust its schedule for transmission to prioritize transmission to or reception from the second STA/AP over transmission to or reception from the first STA/AP. Likewise, the receiving STA/AP may use a transmit opportunity that was previously scheduled for the first STA/AP for transmission to or reception from the second STA/AP.

Figure 3:
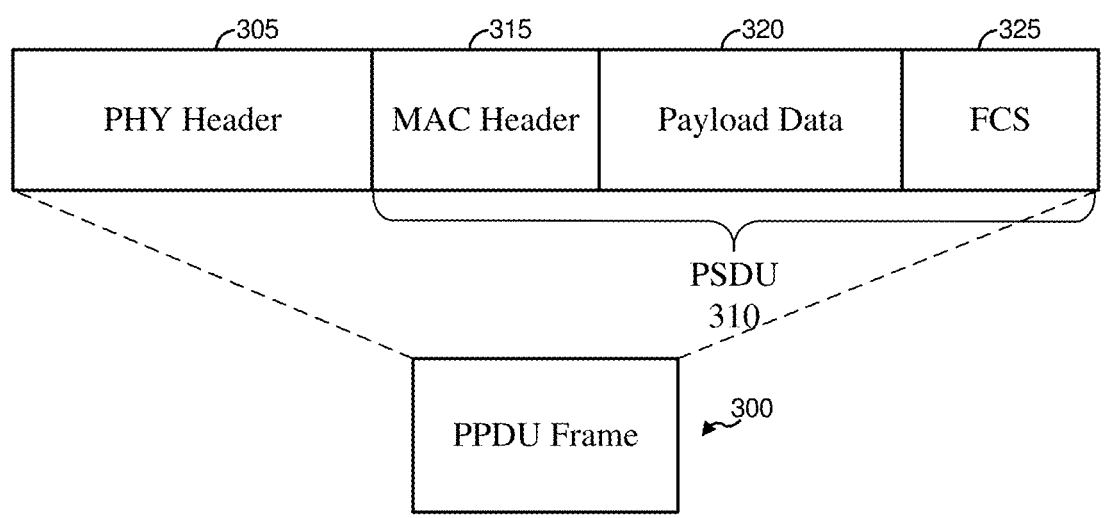
FIG. 3 is a diagram illustrating an example PPDU frame that may be used to report Quality of Service (QoS) feedback information in accordance with aspects of the present disclosure.

FIG. 3 is a diagram illustrating an example PPDU frame 300 that may be used to report the QoS feedback information in accordance with aspects of the present disclosure. The PPDU frame 300 may comprise a physical layer (PHY) header 305 and a PSDU 310. The PSDU 310 may comprise a MAC header 315, a payload data 320, and a frame check sequence (FCS) field 325. The PSDU 310 may also be referred to as a payload portion of the PPDU frame 300. The PHY header 305 may be used to acquire an incoming OFDM signal, to train and synchronize a demodulator, and may aid in demodulation and delivery of the payload portion or PSDU 310. The PSDU 310 is an MPDU that has been provided from the MAC layer to the PHY layer to form the PPDU frame 300. A transmitting STA and/or a transmitting AP can generate and transmit the PPDU frame 300.

According to some aspects, the QoS feedback information may be included in the MAC header 315 of the MPDU. For instance, the QoS feedback information may be provided in the MAC header 315 on a per-MPDU or per-packet basis. In some aspects, the QoS feedback information may be included in one or more control fields of the MAC header 315. For example, the QoS feedback information may be included in a QoS control field, such as a QoS feedback control field, of the MAC header 315. In another example, the QoS feedback information may be included in a High Throughput (HT) control field of the MAC header 315. For example, the QoS feedback information may be included in an HT control field, an HE control field, an EHT control field, an HT variant control field, a Very High Throughput (VHT) variant HT control field, a High Efficiency (HE) variant HT control field, an EHT variant HT control field, etc. of the MAC header 315. The QoS feedback For instance, the QoS feedback information may be included in an A-Control subfield of the HE variant HT control field. However, the QoS feedback information may be included in other fields and/or other control fields of the MAC header 315.

Figure 4:
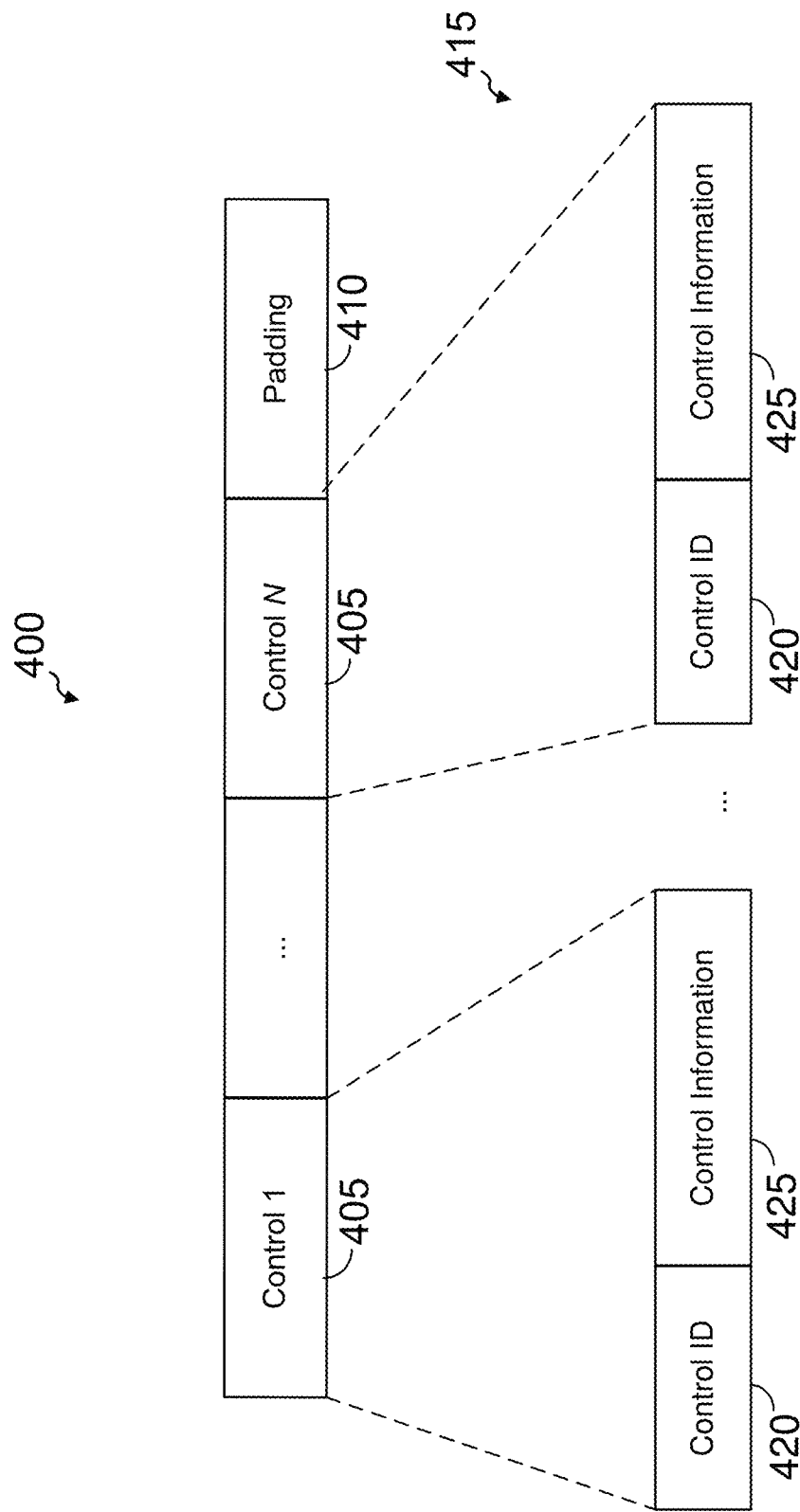
FIG. 4 is a diagram illustrating an example control field that may be used to contain the QoS feedback information in accordance with aspects of the present disclosure.

FIG. 4 is a diagram illustrating an example control field 400 that may be used to contain the QoS feedback information in accordance with aspects of the present disclosure. The control field 400 may be included in the MAC header 315 (in FIG. 3). The control field 400 may be backward compatible in that it is a flexible variant of an existing control field in accordance with an 802.11 protocol, and may also be forward compatible in that it may be expansible for future amendments. The control field 400 may comprise a sequence of one or more control subfields 405 and padding 410. The number of control subfields 405 may be variable depending on the control information to be included in the control field 400. Below the control field 400, is an expanded view of an example format 415 of the control subfields 405. Each of the control subfields 405 may comprise a control identifier (ID) field 420 and a control information field 425. The control ID field 420 may comprise an indication of the content, type, and/or length of the information included in the control information field 425. For example, the control ID field 420 may comprise 4 bits or anywhere between 1 to 6 bits or any amount of bits. The control field 400 may comprise a variable length depending on the number of control subfields 405 present and/or the type and/or amount of information included in the control information field 425 of each control subfield 405.

In some aspects, the control ID field 420 may include an indicator indicating a type of information for communication in the control information field 425 is QoS feedback information, and the control information field 425 may comprise one or more subfields containing the QoS feedback information. Although shown and described as a control ID field 420 and control information field 425, any ID field and any information field may be used to communicate the same information. More specifically, the indicator indicating a type of information for communication is QoS feedback information may be included in any ID field, and the one or more subfields containing the QoS feedback information may be included in any information field.

FIG. 5 is a chart 500 illustrating example values for the control ID field 420 (FIG. 4) and what those values indicate about the information in the control information field 425 (FIG. 4), in accordance with aspects of the present disclosure. Column 505 illustrates various values for the control ID field 420, column 510 illustrates various descriptions for the type of control information included in the control information field 425 associated with the various values in the control ID field 420, column 515 illustrates the various lengths of the control information field 425 in bits, and column 520 illustrates the various content of the control information field 425. However, more columns, less columns, and/or other configurations may be used to illustrate the example values for the control ID field 420 and what those values indicate about the information in the control information field 425.

For example, as illustrated in row 525, a value of "0" in the control ID field 420 may indicate the control information field 425 contains triggered response scheduling (TRS) information for soliciting an HE trigger-based (TB) PPDU (HE TB PPDU); as illustrated in row 530, a value of "1" in the control ID field 420 may indicate the control information field 425 contains information related to the operating mode (OM) change of the STA transmitting the frame containing this information; as illustrated in row 535, a value of "2" in the control ID field 420 may indicate the control information field 425 contains information related to the HE link adaptation (HLA) procedure; as illustrated in row 540, a value of "3" in the control ID field 420 may indicate the control information field 425 contains buffer status information used for uplink (UL) MU operation; as illustrated in row 545, a value of "4" in the control ID field 420 may indicate the control information field 425 contains the UL power headroom (UPH) used for power pre-correction; as illustrated in row 550, a value of "5" in the control ID field 420 may indicate the control information field 425 contains the bandwidth query report (BQR) used for BQR operation to assist HE MU transmission; as illustrated in row 555, a value of "6" in the control ID field 420 may indicate the control information field 425 contains the command and status (CAS) control; as illustrated in row 560, a value of "7" in the control ID field 420 may indicate the control information field 425 contains the QoS Feedback Report (QFR) that includes the QoS feedback information for one or more QoS metrics; as illustrated in row 565, values of "8" through "14" in the control ID field 420 may be reserved for future indications; and as illustrated in row 570, a value of "15" in the control ID field 420 may indicate the receiving STA/AP should ignore the remainder of the control field 400.

The values and descriptions provided in the chart 500 are for example purposes only, and other descriptions, lengths, and content for the various values of the control ID field 420 are possible. For instance, any of the values of "8" through "14" may in the control ID field 420 may indicate the control information field 425 contains the QFR that includes the QoS feedback information for one or more QoS metrics. Various other information in the control information field 425 may be associated with values "1" through "15" in the control ID field 420 than that listed in the chart 500. Furthermore, although referred to as the QFR, other labels may be used for the QoS feedback information or other parameters associated with low latency or time sensitive traffic.

Figure 6:
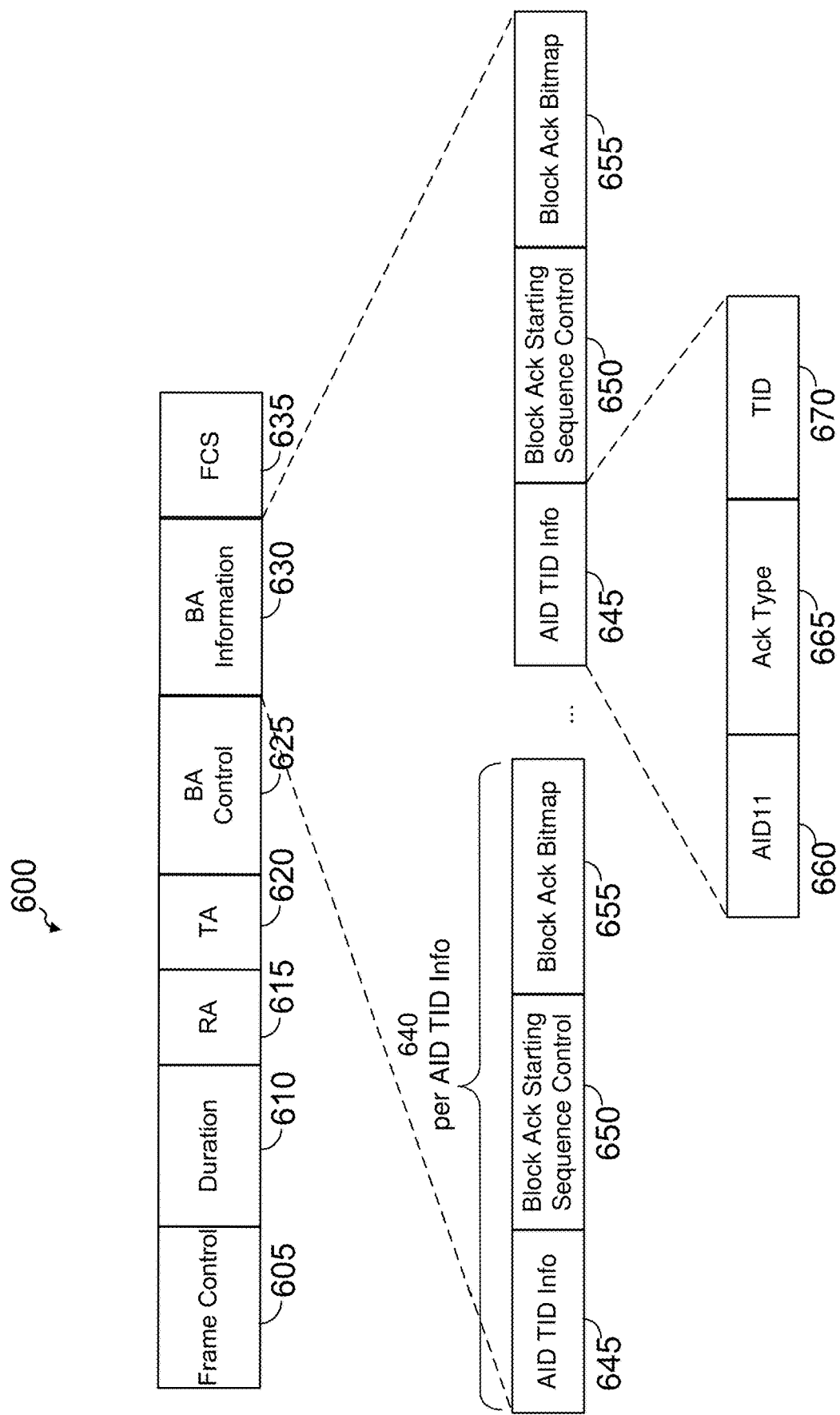
FIG. 6 is a diagram illustrating an example block acknowledgement (BA) frame that may be used to report the QoS feedback information in accordance with aspects of the present disclosure.

FIG. 6 is a diagram illustrating an example block acknowledgement (BA) frame 600 that may be used to report the QoS feedback information in accordance with aspects of the present disclosure. According to some aspects, the QoS information may be included in one or more fields of the BA frame 600. The BA frame 600 may include a frame control field 605, a duration/ID field 610, a receiver address (RA) field 615, a transmitter address (TA) field 620, a BA control field 625, a BA information field 630, and a frame check sequence (FCS) field 635. The BA information field 630 may comprise one or more per association identifier (AID) traffic identifier (TID) information fields 640. Each of the one or more per AID TID information fields 640 may include an indicator indicating a presence of QoS feedback information, and the BA information field 630 may include one or more subfields containing the QoS feedback information. However, the indicator indicating the presence of the QoS feedback information may be included in other fields of the BA information field 630 and/or in other fields of the BA frame 600, such as the BA control field 625. In some aspects, the BA frame 600 may comprise a multi-STA BA frame. The transmitting STA and/or the transmitting AP may generate and transmit the BA frame 600.

Each of the per AID TID information fields 640 may comprise an AID TID information subfield 645, a BA starting sequence control subfield 650, and a BA bitmap subfield 655. The AID TID information subfield 645 may include an AID11 subfield 660, an acknowledgement type subfield 665, and a TID subfield 670. The AID11 subfield 660 may carry the 11 least significant bits (or other indication) of the AID of the STA for which the per AID TID information field 640 is intended. If the per AID TID information field 640 is intended for an AP, a value of the AID11 subfield 660 may be "0", although other indications may be used. The acknowledgement type subfield 665 may indicate if an acknowledgement is being sent as a BA or not. The TID subfield 670 may contain the TID for which the acknowledgement or BA included in the per AID TID information field 640 applies.

In some aspects, the indicator indicating the presence of the QoS feedback information may be included in the AID TID information subfield 645, such as in the acknowledgement type subfield 665 and/or the TID subfield 670. For example, a combination of values for the acknowledgement type subfield 665 and the TID subfield 670 may comprise the indicator indicating the presence of QoS feedback information. Alternatively or additionally, the indicator indicating the presence of the QoS feedback information may be included in other subfields of the AID TID information subfield 645 and/or in other fields of the per AID TID information field 640, such as in the BA starting sequence control subfield 650 and/or the BA bitmap subfield 655. Other configurations for inclusion of the indicator in the BA information field 630 or the per AID TID information field 640 may be used. In some aspects, the BA bitmap subfield 655 may contain the QoS feedback information. For example, the BA bitmap subfield 655 may include a bitmap containing the QoS feedback information. Alternatively or additionally, other fields and/or subfields of the BA information field 630 may contain the QoS feedback information, such as the BA starting sequence control subfield 650 and/or the AID TID information subfield 645.

FIG. 7 is a chart 700 illustrating example values for the per AID TID information field 640 (FIG. 6), in accordance with aspects of the present disclosure. Column 705 illustrates various values for the acknowledgement type subfield 665, column 710 illustrates various values for the TID subfield 670, column 715 illustrates whether the BA starting sequence control subfield 650 and the BA bitmap subfield 655 are present based on the associated combination of values in the acknowledgement type subfield 665 and the TID subfield 670, and column 720 illustrates the various contexts of the per AID TID information field 640 in the BA frame 600. However, more columns, less columns, and/or other configurations may be used to illustrate the example values for the per AID TID information field 640.

For example, as illustrated in row 730 and row 755, a value of "1" in the acknowledgement type subfield 665 and a value of less than "8" or equal to "15" in the TID subfield 670 may indicate the BA starting sequence control subfield 650 and the BA bitmap subfield 655 are not present, and the per AID TID information field 640 acknowledges successful reception of a single MPDU indicated by the TID of the AID TID information subfield 645; as illustrated in row 745, a value of "1" in the acknowledgement type subfield 665 and a value of "14" in the TID subfield 670 may indicate the BA starting sequence control subfield 650 and the BA bitmap subfield 655 are not present, and the per AID TID information field 640 acknowledges successful reception of all the MPDUs carried in the eliciting aggregated MPDU (A-MPDU); as illustrated in row 725, a value of "0" in the acknowledgement type subfield 665 and a value of less than "8" in the TID subfield 670 may indicate the BA starting sequence control subfield 650 and the BA bitmap subfield 655 are present, and the per AID TID information field 640 is a block acknowledgement, such as in response to an MU block acknowledgement request (MU-BAR) trigger frame; as illustrated in row 740, a value of "0" in the acknowledgement type subfield 665 and a value of "14" in the TID subfield 670 may indicate the BA starting sequence control subfield 650 and the BA bitmap subfield 655 are present, and the per AID TID information field 640 contains the QoS feedback information, such as one or more subfields of the BA information field 630 contains the QoS feedback information for one or more QoS metrics; and as illustrated in row 735 and row 750, certain combinations of values for the acknowledgement type subfield 665 (e.g., values "0" or "1") and the TID subfield 670 (e.g., values "8-12" or "15") may be reserved for future indications.

The values and descriptions provided in the chart 700 are for example purposes only, and other descriptions and context for the various combinations of values for the acknowledgement type subfield 665 and the TID subfield 670 are possible. For instance, any of the combination of values for the acknowledgement type subfield 665 and the TID subfield 670 in row 735 and row 750 that are reserved may be used to indicate the per AID TID information field 640 contains the QoS feedback information for one or more QoS metrics. Various other information in the per AID TID information field 640 may be associated with the combination of acknowledgement type subfield 665 and TID subfield 670 values than that listed in the chart 700.

Figure 8:
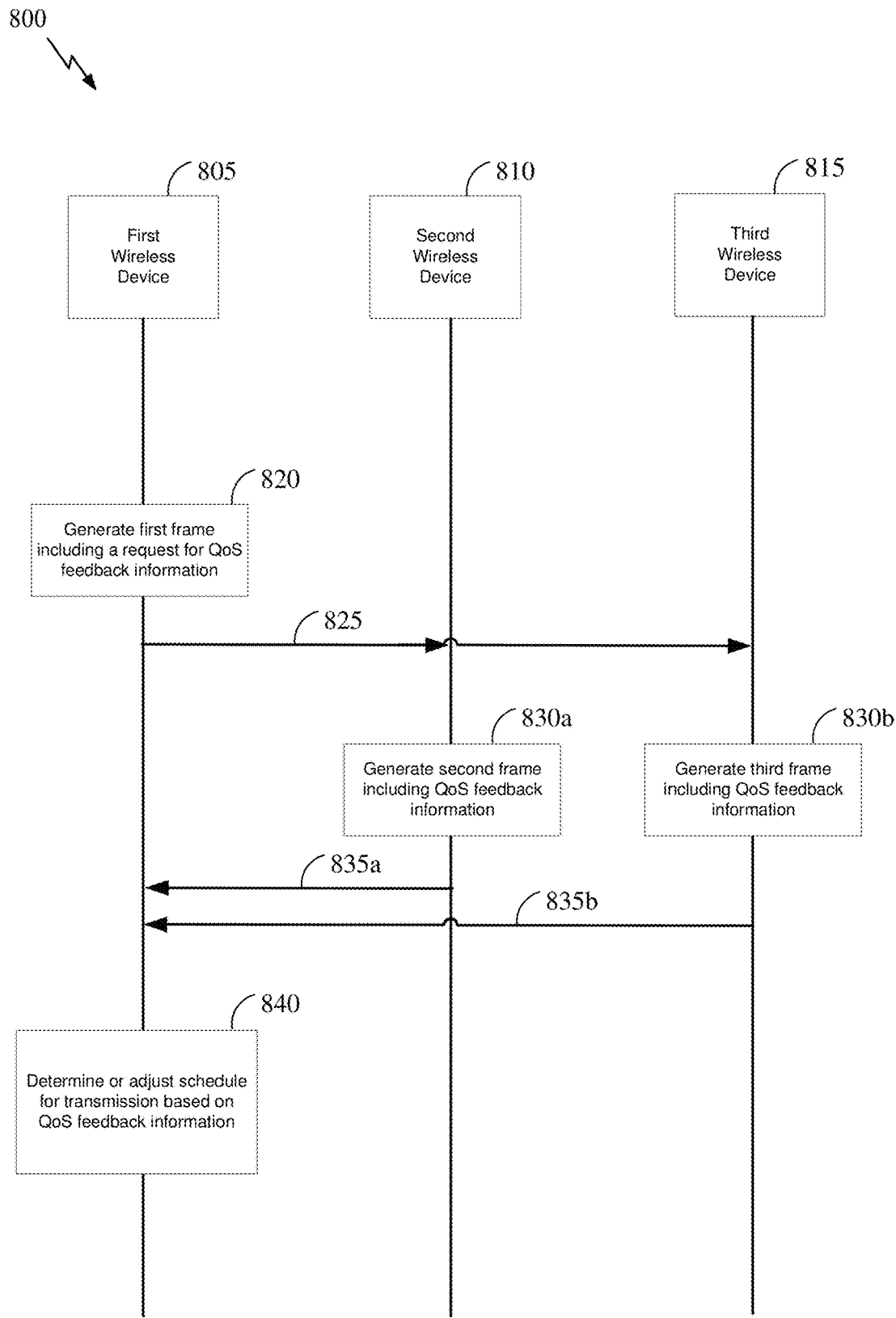
FIG. 8 illustrates an example of a process flow that supports communication of QoS feedback information in accordance with aspects of the present disclosure.

FIG. 8 illustrates an example of a process flow 800 that supports communication of QoS feedback information in accordance with various aspects of the present disclosure. Process flow 800 may include a first wireless device 805, a second wireless device 810, and an optional third wireless device 815. Each of the first wireless device 805, the second wireless device 810, and the third wireless device 815 may comprise either a STA or an AP. In the process flow 800, communication with the third wireless device 815 is optional and described herein for example purposes only, in order to illustrate multi-user communications. It is to be understood that the process flow 800 may not include the third wireless device 815 and may not include communications with the third wireless device 815. The process flow 800 may only include the first wireless device 805 and the second wireless device 810 and communications therebetween. Alternatively, the process flow 800 may include more than three wireless devices and communications between more than three wireless devices.

At step 820, the first wireless device 805 may optionally generate a first frame including a request for QoS feedback information. According to some aspects, the first frame may comprise a trigger frame, such as a QoS feedback report poll (QFRP) trigger frame, a null data packet (NDP) feedback report poll (NFRP) trigger frame, a buffer status report poll (BFRP) trigger frame, or any other type of trigger frame. The first frame may be used to poll receiving STAs/APs for their QoS feedback information.

At step 825, the first wireless device 805 may transmit the first frame including the request for QoS feedback information to the second wireless device 810 and to the third wireless device 815.

At steps 830*a* and 830*b*, the second wireless device 810 may generate a second frame, and the third wireless device 815 may generate a third frame, respectively. Each of the second frame and the third frame may include the QoS feedback information, such as a report and/or a bitmap containing the QoS feedback information. For example, the second frame may include the QoS feedback information associated with the second wireless device 810, and the third frame may include the QoS feedback information associated with the third wireless device 815. Each of the second frame and the third frame may be generated by the second wireless device 810 and the third wireless device 815, respectively, in response to each of the second wireless device 810 and the third wireless device 815 receiving the first frame.

Alternatively, each of the second frame and the third frame may be generated by the second wireless device 810 and the third wireless device 815, respectively, without receiving the first frame, such as on a per-MPDU basis or a per-packet basis. For instance, each of the second frame and the third frame may be unsolicited (i.e., not trigger based). The QoS feedback information may be included in a control field of the MAC header of an MPDU, as part of a BA frame, or in any other signaling mechanism of a frame.

At steps 835*a* and 835*b*, the second wireless device 810 may transmit the second frame to the first wireless device 805, and the third wireless device 815 may transmit the third frame to the first wireless device, respectively. The second frame and/or the third frame may be included in a trigger-based PPDU (TB PPDU), such as an HE TB PPDU, a NDP TB PPDU, an HE NDP TB PPDU, a MU PPDU, an HE MU PPDU, an UL MU PPDU, or any other type of PPDU. Optionally (not shown), at steps 835*a* and 835*b*, the second wireless device 810 may also transmit the second frame to the third wireless device 815, and the third wireless device 815 may also transmit the third frame to the second wireless device 810.

At step 840, the first wireless device 805 may determine a schedule for transmission or adjust its schedule for transmission based on the QoS feedback information. For example, the first wireless device 805 may accommodate traffic of the second wireless device 810 based on the QoS feedback information received in the second frame. Alternatively or additionally, the first wireless device 805 may accommodate traffic of the third wireless device 815 based on the QoS feedback information received in the third frame.

In some aspects, the first wireless device 805 may compare the QoS feedback information from the second wireless device 810 with the QoS feedback information from the third wireless device 815. The first wireless device 805 may determine the schedule for transmission or adjust the schedule for transmission based on the comparison of the QoS feedback information from the second wireless device 810 and the third wireless device 815. For example, the first wireless device 805 may prioritize transmission to or reception from the second wireless device 810 over transmission to or reception from the third wireless device 815 based on the comparison of their respective QoS feedback information. For instance, instead of communicating on a transmit opportunity reserved for the third wireless device 815, as may have been previously scheduled, the first wireless device 805 may use the transmit opportunity reserved for the third wireless device 815 to communicate with the second wireless device 810. Therefore, based on the comparison of the QoS feedback information, the first wireless device 805 may accommodate the prioritized QoS requirements of the second wireless device 810.

Alternatively, the first wireless device 805 may prioritize transmission to or reception from the third wireless device 815 over transmission to or reception from the second wireless device 810 based on the comparison of their respective QoS feedback information. For instance, instead of communicating on a transmit opportunity reserved for the second wireless device 810, as may have been previously scheduled, the first wireless device 805 may use the transmit opportunity reserved for the second wireless device 810 to communicate with the third wireless device 815. Therefore, based on the comparison of the QoS feedback information, the first wireless device 805 may accommodate the prioritized QoS requirements of the third wireless device 815. The first wireless device 805 may make other adjustments to its scheduler or the transmission schedule based on the QoS feedback information and/or the comparison of the QoS feedback information from the second wireless device 810 and the third wireless device 815.

Figure 9:
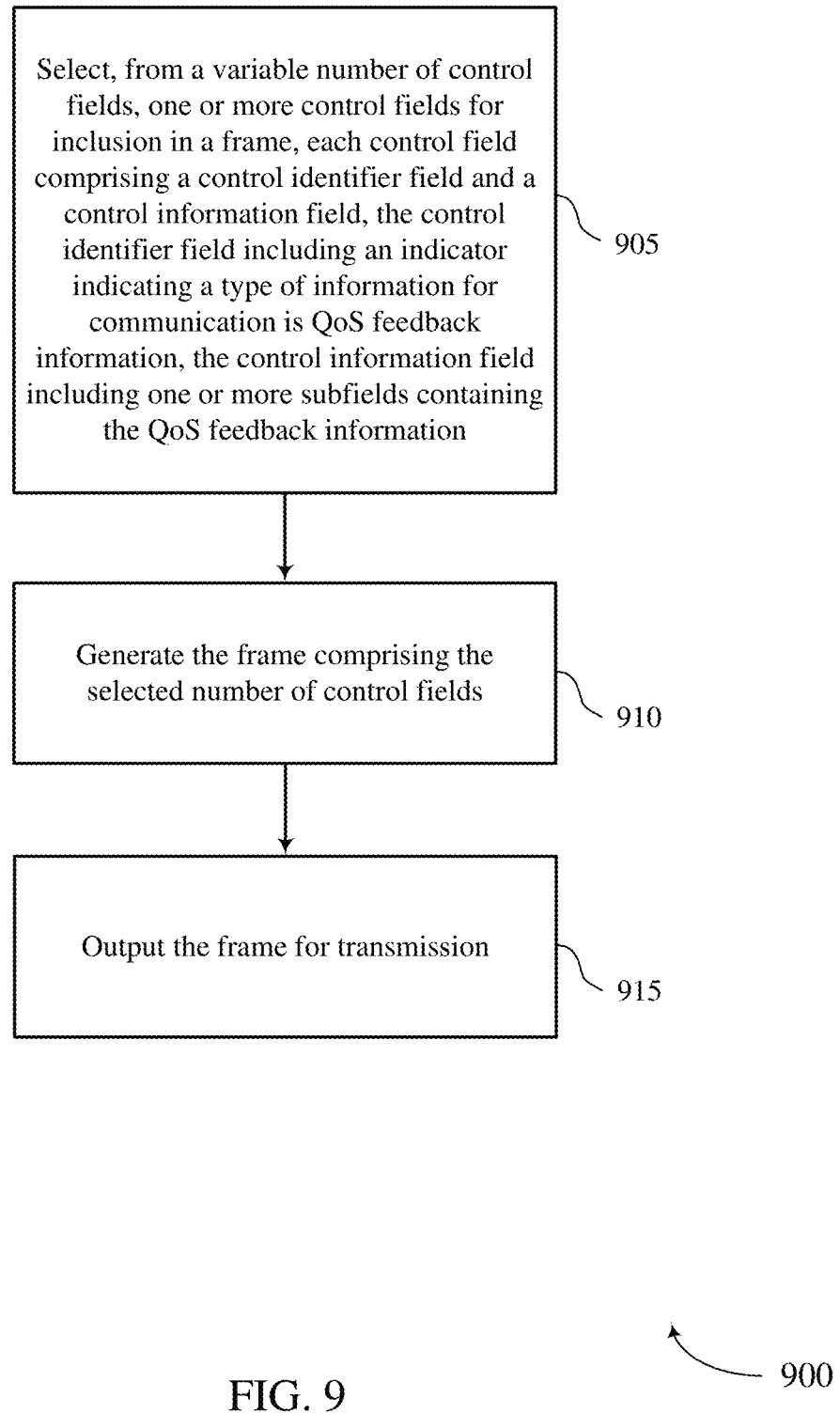
FIG. 9 illustrates a flowchart of an example method that supports reporting mechanisms for QoS feedback information in accordance with aspects of the present disclosure.

FIG. 9 illustrates a flowchart of an example method 900 that supports reporting mechanisms for QoS feedback information in accordance with various aspects of the present disclosure. The method 900 may be implemented by a transmitting STA, a transmitting AP, a receiving STA, a receiving AP, a wireless device, a wireless node, an apparatus, a wireless modem, a chipset, a system, and any other suitable device. Although the method 900 is described herein with reference to a particular order, in various examples, blocks herein may be performed in a different order, or omitted, and additional blocks may be added.

In block 905, the method comprises selecting, from a variable number of control fields, one or more control fields for inclusion in a frame, each control field comprising a control identifier field and a control information field, the control identifier field including an indicator indicating a type of information for communication is QoS feedback information, the control information field including one or more subfields containing the QoS feedback information.

In block 910, the method comprises generating the frame comprising the selected number of control fields. In block 915, the method comprises outputting the frame for transmission.

Figure 10:
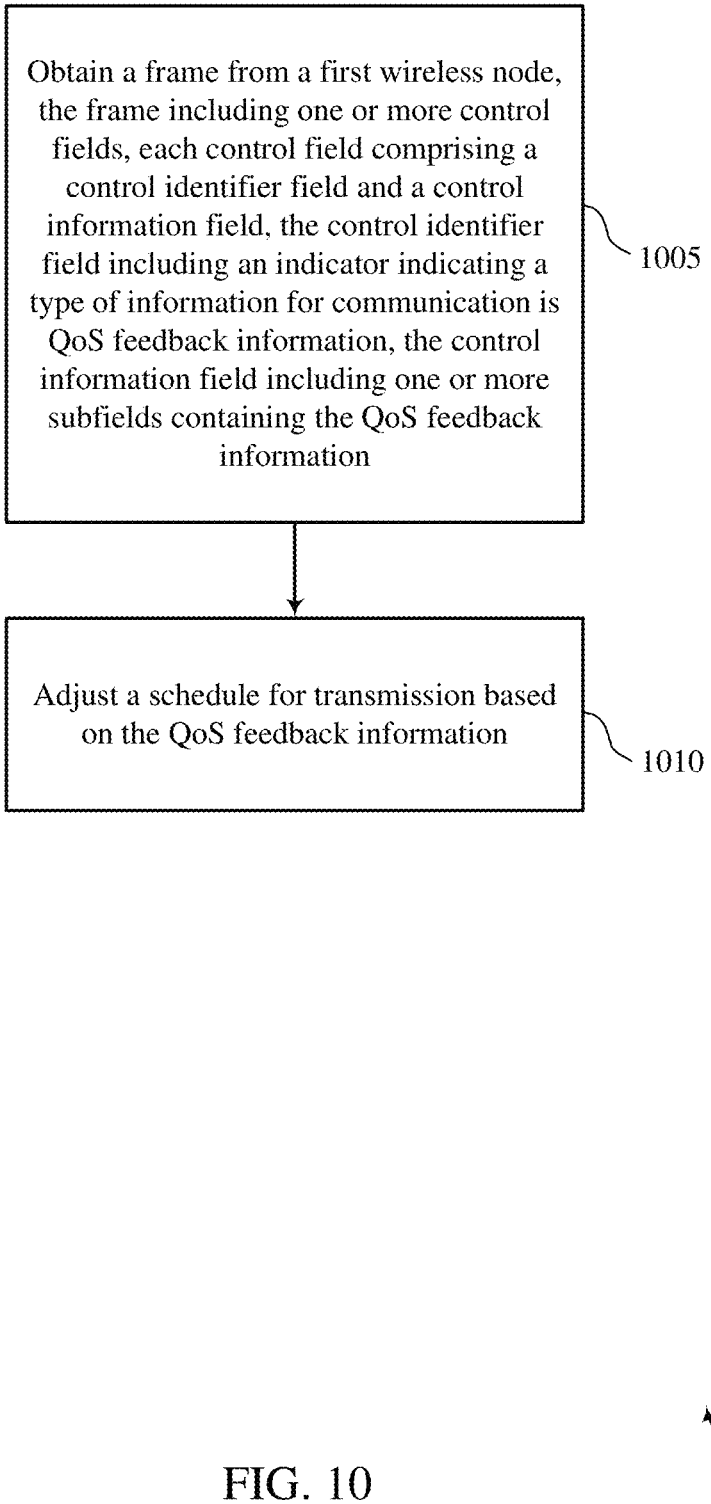
FIG. 10 illustrates a flowchart of an example method that supports reporting mechanisms for QoS feedback information in accordance with aspects of the present disclosure.

FIG. 10 illustrates a flowchart of an example method 1000 that supports reporting mechanisms for QoS feedback information in accordance with various aspects of the present disclosure. The method 1000 may be implemented by a receiving STA, a receiving AP, a transmitting STA, a transmitting AP, a wireless device, a wireless node, an apparatus, a wireless modem, a chipset, a system, and any other suitable device. Although the method 1000 is described herein with reference to a particular order, in various examples, blocks herein may be performed in a different order, or omitted, and additional blocks may be added.

In block 1005, the method comprises obtaining a frame from a first wireless node, the frame including one or more control fields, each control field comprising a control identifier field and a control information field, the control identifier field including an indicator indicating a type of information for communication is QoS feedback information, the control information field including one or more subfields containing the QoS feedback information.

In block 1010, the method comprises adjusting a schedule for transmission based on the QoS feedback information.

Figure 11:
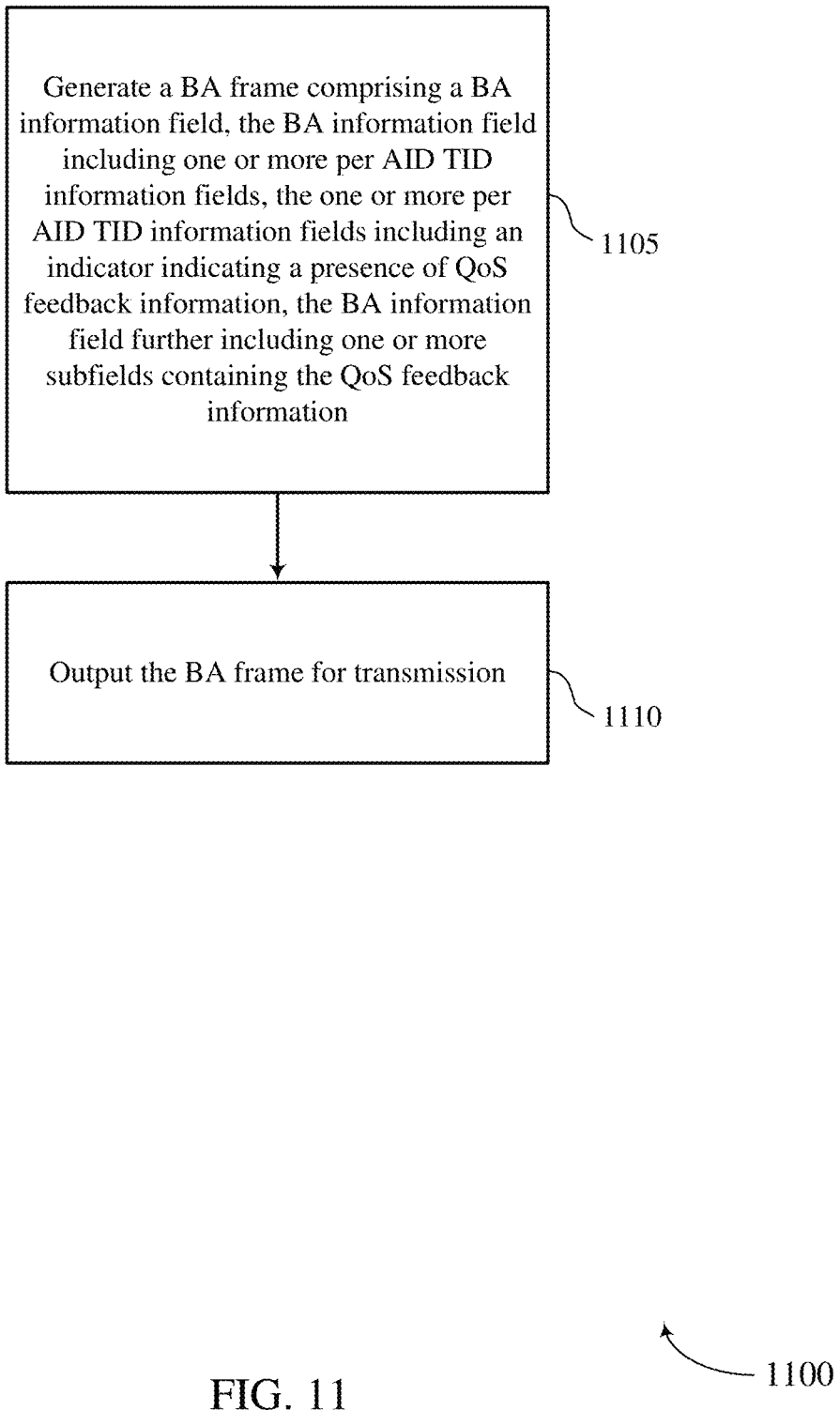
FIG. 11 illustrates a flowchart of an example method that supports reporting mechanisms for QoS feedback information in accordance with aspects of the present disclosure.

FIG. 11 illustrates a flowchart of an example method 1100 that supports reporting mechanisms for QoS feedback information in accordance with various aspects of the present disclosure. The method 1100 may be implemented by a transmitting STA, a transmitting AP, a receiving STA, a receiving AP, a wireless device, a wireless node, an apparatus, a wireless modem, a chipset, a system, and any other suitable device. Although the method 1100 is described herein with reference to a particular order, in various examples, blocks herein may be performed in a different order, or omitted, and additional blocks may be added.

In block 1105, the method comprises generating a BA frame comprising a BA information field, the BA information field including one or more per AID TID information fields, the one or more per AID TID information fields including an indicator indicating a presence of QoS feedback information, the BA information field further including one or more subfields containing the QoS feedback information.

In block 1110, the method comprises outputting the BA frame for transmission.

Figure 12:
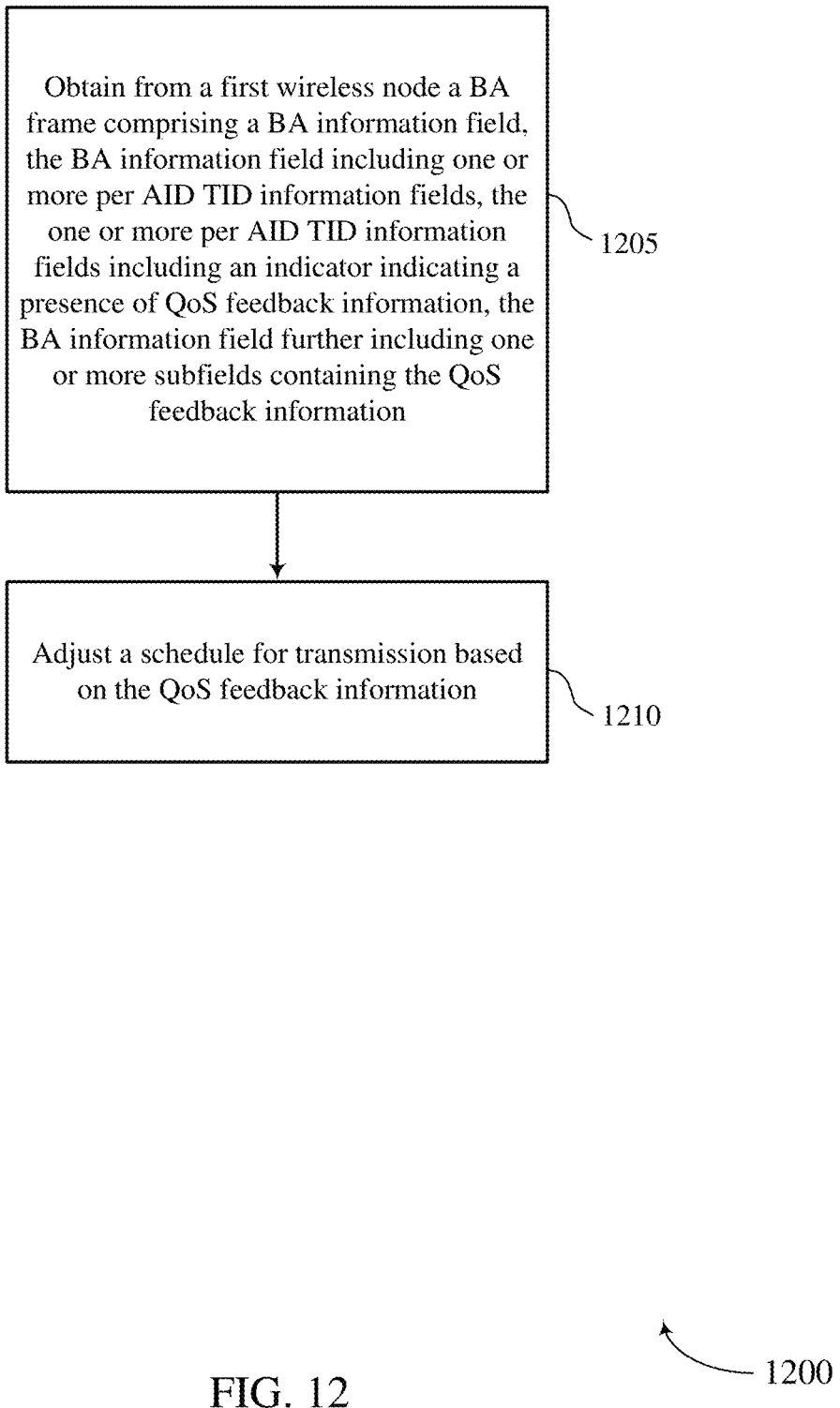
FIG. 12 illustrates a flowchart of an example method that supports reporting mechanisms for QoS feedback information in accordance with aspects of the present disclosure.

FIG. 12 illustrates a flowchart of an example method 1200 that supports reporting mechanisms for QoS feedback information in accordance with various aspects of the present disclosure. The method 1200 may be implemented by a receiving STA, a receiving AP, a transmitting STA, a transmitting AP, a wireless device, a wireless node, an apparatus, a wireless modem, a chipset, a system, and any other suitable device. Although the method 1200 is described herein with reference to a particular order, in various examples, blocks herein may be performed in a different order, or omitted, and additional blocks may be added.

In block 1205, the method comprises obtaining from a first wireless node a BA frame comprising a BA information field, the BA information field including one or more per AID TID information fields, the one or more per AID TID information fields including an indicator indicating a presence of QoS feedback information, the BA information field further including one or more subfields containing the QoS feedback information.

In block 1210, the method comprises adjusting a schedule for transmission based on the QoS feedback information.

Figure 13:
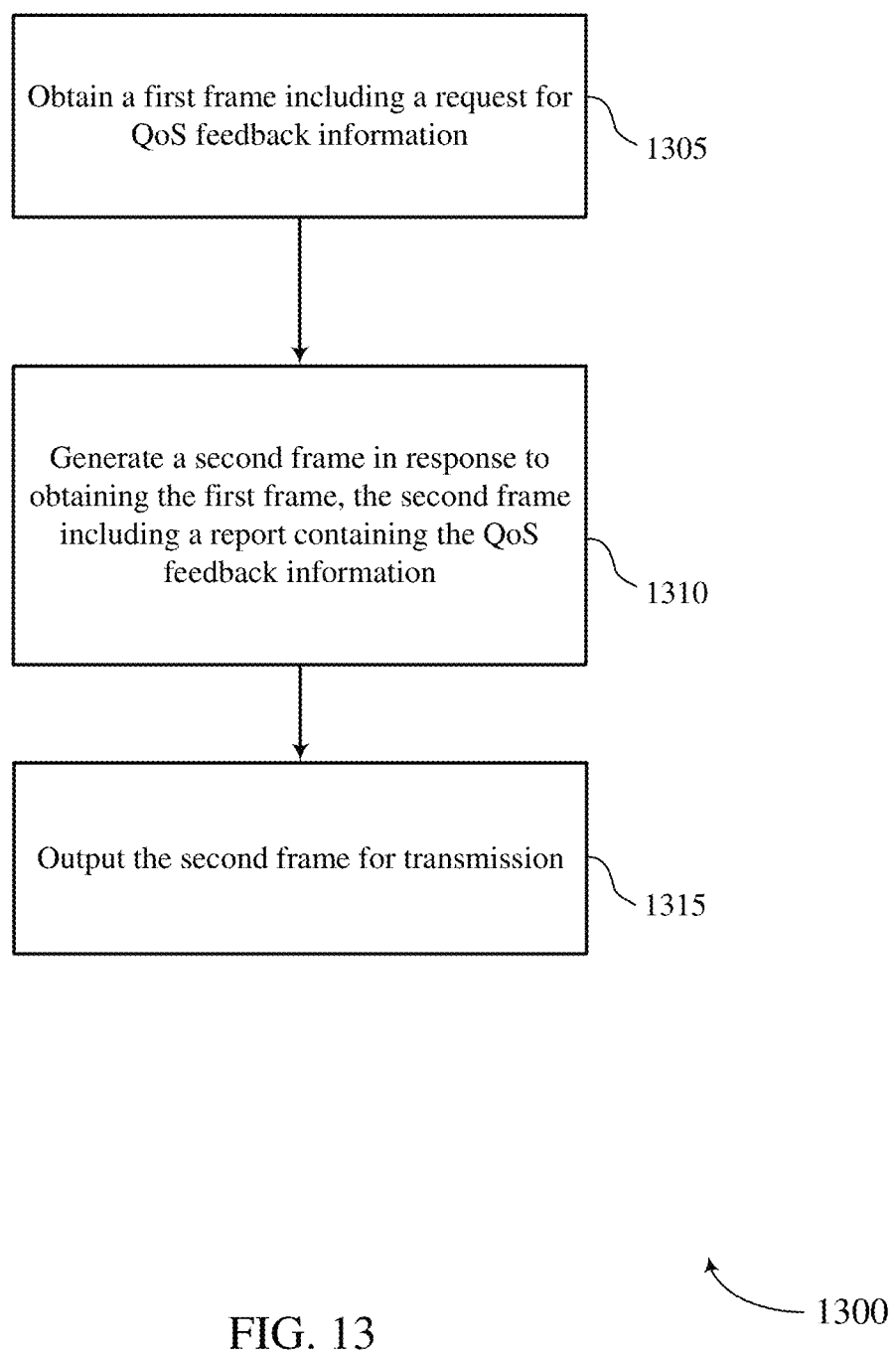
FIG. 13 illustrates a flowchart of an example method that supports reporting mechanisms for QoS feedback information in accordance with aspects of the present disclosure.

FIG. 13 illustrates a flowchart of an example method 1300 that supports reporting mechanisms for QoS feedback information in accordance with various aspects of the present disclosure. The method 1300 may be implemented by a transmitting STA, a transmitting AP, a receiving STA, a receiving AP, a wireless device, a wireless node, an apparatus, a wireless modem, a chipset, a system, and any other suitable device. Although the method 1300 is described herein with reference to a particular order, in various examples, blocks herein may be performed in a different order, or omitted, and additional blocks may be added.

In block 1305, the method comprises obtaining a first frame including a request for QoS feedback information. In block 1310, the method comprises generating a second frame in response to obtaining the first frame, the second frame including a report containing the QoS feedback information. In block 1315, the method comprises outputting the second frame for transmission.

Figure 14:
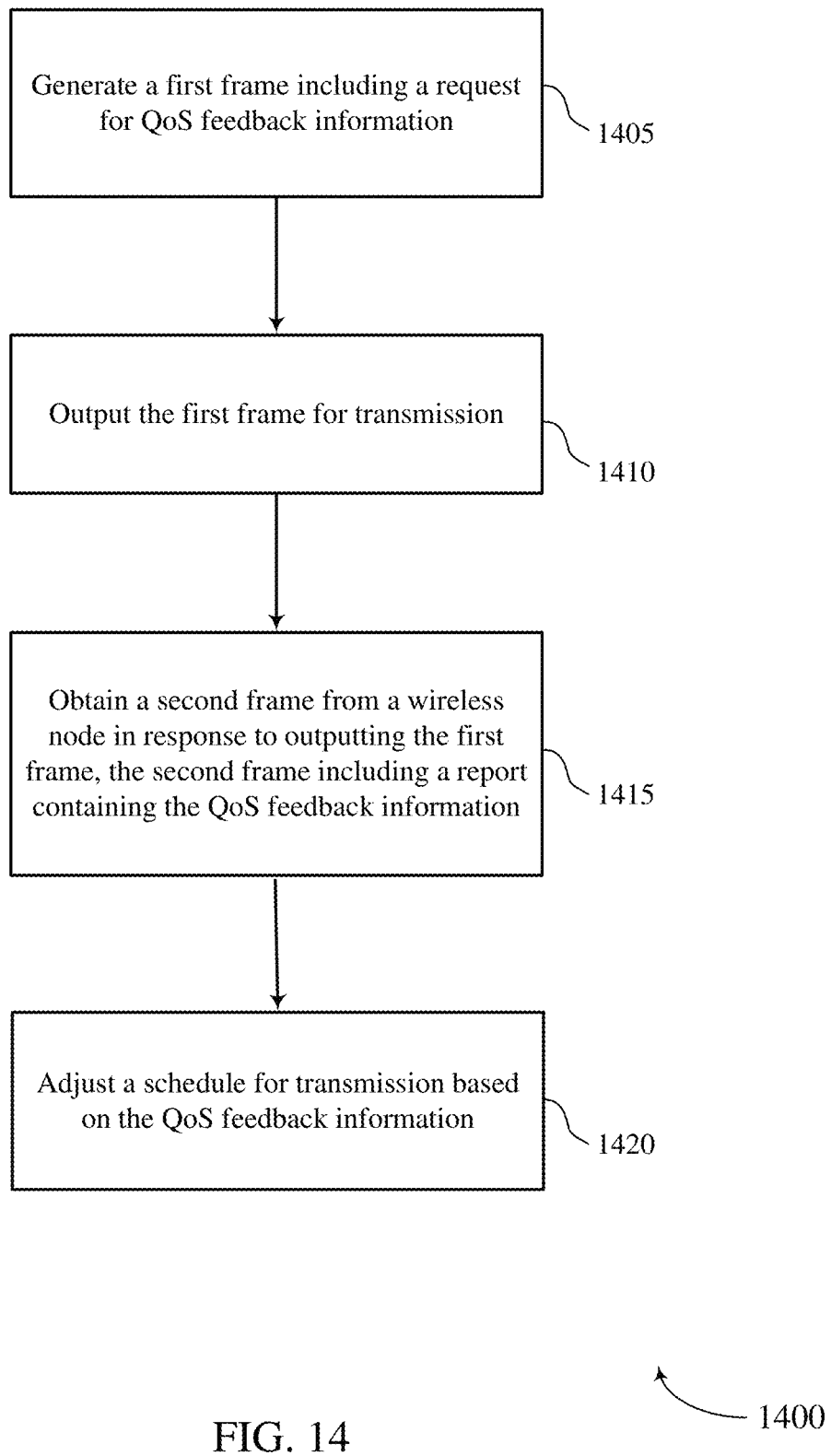
FIG. 14 illustrates a flowchart of an example method that supports reporting mechanisms for QoS feedback information in accordance with aspects of the present disclosure.

FIG. 14 illustrates a flowchart of an example method 1400 that supports reporting mechanisms for QoS feedback information in accordance with various aspects of the present disclosure. The method 1400 may be implemented by a receiving STA, a receiving AP, a transmitting STA, a transmitting AP, a wireless device, a wireless node, an apparatus, a wireless modem, a chipset, a system, and any other suitable device. Although the method 1400 is described herein with reference to a particular order, in various examples, blocks herein may be performed in a different order, or omitted, and additional blocks may be added.

In block 1405, the method comprises generating a first frame including a request for QoS feedback information. In block 1410, the method comprises outputting the first frame for transmission. In block 1415, the method comprises obtaining a second frame from a first wireless node in response to the outputting of the first frame, the second frame including a report containing the QoS feedback information. In block 1420, the method comprises adjusting a schedule for transmission based on the QoS feedback information.

The various operations of methods described herein may be performed by any suitable means capable of performing the corresponding functions. The means may include various hardware and/or software component(s) and/or module(s), including, but not limited to a circuit, an application specific integrated circuit (ASIC), or a processor. Generally, where there are operations illustrated in figures, those operations may have corresponding counterpart means-plus-function components with similar numbering.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception. In some cases, the interface to output a frame for transmission and the interface to obtain a frame (which may be referred to as first and second interfaces herein) may be the same interface.

FIGS. 1-14 and the operations described herein are examples meant to aid in understanding example implementations and should not be used to limit the potential implementations or limit the scope of the claims. Some implementations may perform additional operations, fewer operations, operations in parallel or in a different order, and some operations differently.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described throughout. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-Ray™ disc where disks usually reproduce data magnetically, while discs reproduce data optically with lasers. Combinations also can be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example process in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus for wireless communication, comprising:
a processing system configured to:
determine one or more metric types of Quality of Service (QoS) feedback information of a plurality of metric types of QoS feedback information based on a negotiation between the apparatus and a wireless node;
select, from a variable number of control fields, one or more control fields for inclusion in a frame, each control field comprising a control identifier field and a control information field, the control identifier field including an indicator indicating a type of information for communication is QoS feedback information, the control information field including one or more subfields containing the one or more metric types of QoS feedback information based on the determination,
the control information field indicating whether an actual value for each of the one or more metric types of QoS feedback information meets or exceeds an associated threshold for each of the one or more metric types of QoS feedback information; and
generate the frame comprising the selected one or more control fields; and
a first interface in communication with the processing system, the first interface configured to output the frame for transmission to the wireless node.

2. The apparatus of claim 1, wherein the one or more metric types of QoS feedback information comprises low latency metrics, timing metrics, buffer metrics, or a combination thereof.

3. The apparatus of claim 2, wherein the low latency metrics include a delay, a delay jitter, an end-to-end latency, a packet loss rate, a data rate, or a combination thereof.

4. The apparatus of claim 2, wherein the timing metrics include a target transmission time, a target reception time, a periodicity of packet inter-arrival time, or a combination thereof.

5. The apparatus of claim 2, wherein the buffer metrics include a buffer unit aging timer, a buffer overflow flag, a buffer increase rate, or a combination thereof.

6. The apparatus of claim 1, wherein the one or more subfields indicate instantaneous values for the QoS feedback information, average values over multiple transmit opportunities for the QoS feedback information, average values over multiple beacon intervals for the QoS feedback information, or a combination thereof.

7. The apparatus of claim 1, wherein the first interface is further configured to output for transmission to or obtain from a wireless node, a second frame including the one or more metric types of QoS feedback information for inclusion in the one or more subfields containing the QoS feedback information.

8. The apparatus of claim 1, wherein the processing system is further configured to normalize one or more values of the QoS feedback information for inclusion in the one or more subfields based on a predetermined range.

9. An apparatus for wireless communication, comprising:
a processing system in communication with a first interface and a second interface configured to determine one or more metric types of Quality of Service (QoS) feedback information of a plurality of metric types of QoS feedback information based on a negotiation between the apparatus and a first wireless node; the first interface configured to output for transmission to the first wireless node an indication indicating the one or more metric types of QoS feedback information;
the second interface configured to obtain a frame from the first wireless node, the frame including one or more control fields, each control field comprising a control identifier field and a control information field, the control identifier field including an indicator indicating a type of information for communication is QoS feedback information, the control information field including one or more subfields containing the one or more metric types of QoS feedback information based on the indication, the control information field indicating whether an actual value for each of the one or more metric types of QoS feedback information meets or exceeds an associated threshold for each of the one or more metric types of QoS feedback information; and
the processing system further configured to adjust a schedule for transmission based on the QoS feedback information.

10. The apparatus of claim 9, wherein the second interface is further configured to obtain a second frame from a second wireless node, the second frame including QoS feedback information; wherein the processing system is further configured to compare the QoS feedback information from the first wireless node and the second wireless node; and wherein the processing system is further configured to adjust the schedule for transmission based on the comparison of the QoS feedback information from the first wireless node and the second wireless node.

11. The apparatus of claim 10, wherein the processing system is further configured to adjust the schedule for transmission by prioritizing transmission to or reception from the first wireless node over transmission to or reception from the second wireless node.

12. The apparatus of claim 10, wherein the processing system is further configured to adjust the schedule for transmission by prioritizing transmission to or reception from the second wireless node over transmission to or reception from the first wireless node.

13. An apparatus for wireless communication, comprising:
a first interface configured to obtain from a wireless node a first frame including a request for one or more metric types of Quality of Service (QoS) feedback information of a plurality of metric types of QoS feedback information, wherein the one or more metric types of QoS feedback information are based on a negotiation between the apparatus and the wireless node;
a processing system in communication with the first interface, the processing system configured to generate a second frame in response to obtaining the first frame, the second frame including a report containing the one or more metric types of QoS feedback information, the report including one or more indicators indicating whether actual values for each of the one or more metric types meets or exceeds a predetermined threshold for each of the metric types; and
a second interface in communication with the processing system, the second interface configured to output the second frame for transmission to the wireless node.

14. The apparatus of claim 13, wherein the first frame comprises a trigger frame.

15. The apparatus of claim 14, wherein the trigger frame comprises a QoS Feedback Report Poll (QFRP) trigger frame, a Null Data Packet (NDP) Feedback Report Poll (NFRP) trigger frame, or a Buffer Status Report Poll (BFRP) trigger frame.

16. The apparatus of claim 13, wherein the second frame is included in a trigger-based physical layer convergence protocol data unit (TB PPDU).

17. The apparatus of claim 16, wherein the TB PPDU comprises a High Efficiency TB PPDU (HE TB PPDU).

18. The apparatus of claim 16, wherein the TB PPDU comprises a Null Data Packet TB PPDU (NDP TB PPDU).

19. The apparatus of claim 13, wherein the one or more metric types of QoS feedback information comprises a delay, a schedule, a buffer overflow, a packet loss, or a combination thereof.

20. The apparatus of claim 19, wherein the report includes a bitmap containing QoS feedback information.

21. The apparatus of claim 13, wherein the one or more indicators includes a first indicator indicating whether an actual value for a delay meets or exceeds a predetermined delay threshold.

22. The apparatus of claim 13, wherein the one or more indicators includes a second indicator indicating whether a schedule of the apparatus is satisfied.

23. The apparatus of claim 13, wherein the one or more indicators includes a third indicator indicating whether a buffer overflow event has occurred.

24. The apparatus of claim 13, wherein the one or more indicators includes a fourth indicator indicating whether an actual value for a packet loss meets or exceeds a predetermined packet loss threshold.

25. A method for wireless communication by a first wireless node, comprising:
determining one or more metric types of Quality of Service (QoS) feedback information of a plurality of metric types of QoS feedback information based on a negotiation between the first wireless node and a second wireless node;
selecting, from a variable number of control fields, one or more control fields for inclusion in a frame, each control field comprising a control identifier field and a control information field, the control identifier field including an indicator indicating a type of information for communication is QoS feedback information, the control information field including one or more subfields containing the one or more metric types of QoS feedback information based on the determination, the control information field indicating whether an actual value for each of the one or more metric types of QoS feedback information meets or exceeds an associated threshold for each of the one or more metric types of QoS feedback information;
generating the frame comprising the selected one or more control fields; and
transmitting the frame to the second wireless node.

26. The method of claim 25, wherein the one or more metric types of QoS feedback information comprises low latency metrics, timing metrics, buffer metrics, or a combination thereof.

27. The method of claim 26, wherein the low latency metrics include a delay, a delay jitter, an end-to-end latency, a packet loss rate, a data rate, or a combination thereof.

28. The method of claim 26, wherein the timing metrics include a target transmission time, a target reception time, a periodicity of packet inter-arrival time, or a combination thereof.

29. The method of claim 26, wherein the buffer metrics include a buffer unit aging timer, a buffer overflow flag, a buffer increase rate, or a combination thereof.

30. The method of claim 25, wherein the one or more subfields indicate instantaneous values for the QoS feedback information, average values over multiple transmit opportunities for the QoS feedback information, average values over multiple beacon intervals for the QoS feedback information, or a combination thereof.

* * * * *